C. R. WEST.
SALT STAND.
APPLICATION FILED JULY 15, 1914.

1,139,147. Patented May 11, 1915.

Witnesses
C. R. Bealle
F. R. Bungee

Inventor
C. R. West.
By
Attorney

UNITED STATES PATENT OFFICE.

CHESTER R. WEST, OF COLBERT, GEORGIA.

SALT-STAND.

1,139,147.　　　　Specification of Letters Patent.　　Patented May 11, 1915.

Application filed July 15, 1914. Serial No. 851,132.

*To all whom it may concern:*

Be it known that I, CHESTER R. WEST, a citizen of the United States, residing at Colbert, in the county of Madison and State of Georgia, have invented certain new and useful Improvements in Salt-Stands; and I do hereby declare the following to be a full, clear, and exact description of the invention, such as will enable others skilled in the art to which it appertains to make and use the same.

This invention relates to salt stands, or shakers, and one of the principal objects of the invention is to provide a salt stand formed of a single piece of glass, or an integral salt stand or shaker in which the filling tube or funnel extends within the container for the salt, and the discharge perforations are formed in the discharge nozzle integrally with the stand, thus providing a salt shaker or stand which will not corrode around the discharge opening, and which will insure granular salt in the shaker.

Another object of the invention is to provide a glass salt stand provided with a filling nozzle extended within the salt container and curved backwardly while the discharge nozzle for the salt extends in an opposite direction, so that when the salt is used and the stand is seated on the table, the salt will run back into the container without waste.

The foregoing and other objects may be attained by means of the construction illustrated in the accompanying drawing, in which—

Figure 2:
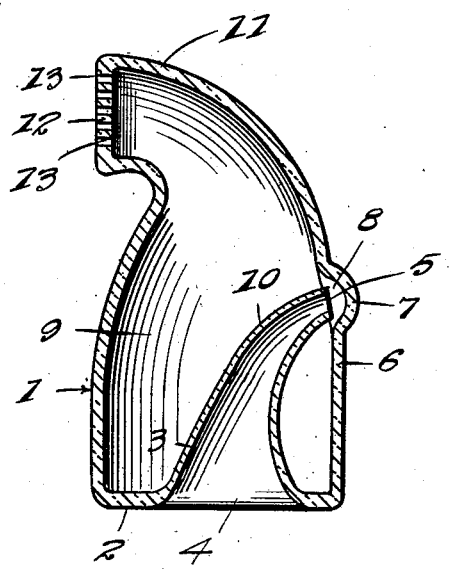
Figure 1:
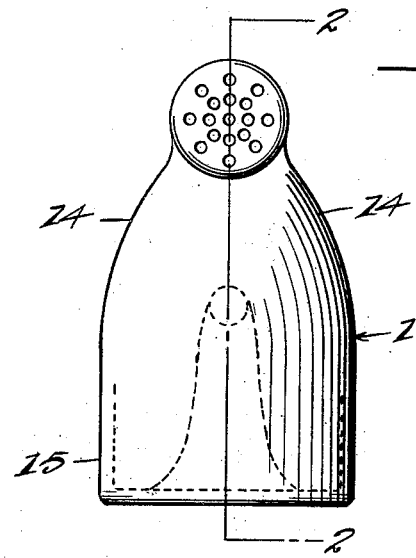

Figure 1 is a view in front elevation of a salt stand or shaker made in accordance with this invention, and Fig. 2 is a vertical sectional view taken on the line 2—2 of Fig. 1.

Referring to the drawing, the numeral 1 designates the salt stand as an entirety, said salt stand being preferably formed of glass and having a round base 2 provided with an integral inwardly extending filling funnel 3, said funnel having an enlarged mouth or intake opening 4, while at its upper curved end the discharge opening 5 is comparatively small thus preventing the entrance of lumps of salt, so that the salt container will only receive granular material. At a point immediately opposite the contracted opening 5 in the filling nozzle, the rear wall 6 of the salt stand is provided with an outwardly bulged portion 7 thus providing a curved by-pass groove 8 in the inner wall of the salt stand to permit the salt to readily pass into the salt chamber 9 when the stand is inverted for the purpose of filling. The filling nozzle is curved at the point 10 backwardly toward the rear wall 6 of the salt stand, while the discharge nozzle 11 is curved in the opposite direction and provided with an integral perforated head 12, the perforations 13 in which may be of any desired size dependent upon the character of the material or salt to be used therewith.

As shown in Fig. 1 the side walls 14 of the stand are curved inwardly to reduce the upper ends of the stand in size and to provide a comparatively heavy base portion 15.

The entire salt stand is molded of glass in one integral and complete stand or shaker. When the stand or shaker is inverted, salt may be fed into the filling funnel until the salt stand is sufficiently full, and when the latter is righted up, the salt will fall into the chamber 9 and will not spill out through the restricted end 5 of the filling funnel.

One of the principal objects of the invention is to provide a salt stand in which the ordinary metal cap is dispensed with, thus providing a sanitary salt stand in which there will be no rust or verdigris such as collects around the ordinary cap or discharge nozzle, when metal is used.

Slight changes may be made in the details of construction without departing from the spirit and scope of the invention as defined in the claims.

What is claimed is:

1. A salt stand made of a single piece of glass and molded in form, said salt stand being provided with an upwardly and outwardly curved filling funnel provided with a restricted discharge opening inside the salt stand, a by-pass groove formed in the rear wall of the stand to permit the salt to enter the salt chamber, and an oppositely curved discharge nozzle provided with perforations.

2. A salt stand formed of glass as an entirety and comprising a base having an inwardly extending curved discharge funnel, a bulging portion at the rear wall, and a by-pass groove formed on the inner surface of said wall adjacent the discharge mouth of the funnel, and a perforated discharge nozzle extending in the direction opposite to the filling funnel.

3. A glass salt stand or shaker provided with an inwardly extending curved filling funnel extending from the bottom of the salt shaker or stand and terminating in a restricted opening adjacent to the rear wall of the shaker, said rear wall having an outwardly bulged portion forming an interior by-pass groove for the salt, and an oppositely curved perforated discharge head or nozzle, said stand being formed complete of a single integral piece of glass.

In testimony whereof I affix my signature in presence of two witnesses.

CHESTER R. WEST.

Witnesses:
J. R. Rowe,
S. R. Hardman.

Copies of this patent may be obtained for five cents each, by addressing the "Commissioner of Patents, Washington, D. C."